United States Patent
Low et al.

(10) Patent No.: US 10,965,204 B2
(45) Date of Patent: Mar. 30, 2021

(54) ADAPTIVE CONTROL FOR RECONFIGURING A REGULATOR AND/OR A CHARGE PUMP FOR A POWER CONVERTER

(71) Applicant: pSemi Corporation, San Diego, CA (US)

(72) Inventors: Aichen Low, Cambridge, MA (US); Gregory Szczeszynski, Hollis, NH (US); David M. Giuliano, Brookline, MA (US)

(73) Assignee: pSemi Corporation, San Diego, CA (US)

(*) Notice: Subject to any disclaimer, the term of this patent is extended or adjusted under 35 U.S.C. 154(b) by 0 days.

(21) Appl. No.: 15/926,100

(22) Filed: Mar. 20, 2018

(65) Prior Publication Data
US 2019/0296630 A1     Sep. 26, 2019

(51) Int. Cl.
| H02M 3/158 | (2006.01) |
| H02M 1/08 | (2006.01) |
| H02M 1/36 | (2007.01) |
| H02H 3/06 | (2006.01) |
| H02M 3/07 | (2006.01) |
| H02M 1/00 | (2006.01) |

(52) U.S. Cl.
CPC .............. *H02M 1/08* (2013.01); *H02H 3/066* (2013.01); *H02M 1/36* (2013.01); *H02M 3/07* (2013.01); *H02M 3/1582* (2013.01); *H02M 2001/007* (2013.01); *H02M 2001/0009* (2013.01)

(58) Field of Classification Search
CPC .. H02M 1/08; H02M 1/36; H02M 2001/0009; H02M 3/07; H02M 3/1582; H02H 3/006
See application file for complete search history.

(56) References Cited

U.S. PATENT DOCUMENTS

| 8,619,445 B1* | 12/2013 | Low | H02M 1/32 363/59 |
| 2009/0278520 A1* | 11/2009 | Perreault | H02M 3/07 323/282 |
| 2014/0266085 A1* | 9/2014 | Unno | H02M 3/04 323/234 |
| 2015/0097538 A1* | 4/2015 | Le | H02M 3/158 323/271 |
| 2015/0229215 A1* | 8/2015 | Choudhary | H02M 3/1582 323/271 |
| 2017/0099011 A1* | 4/2017 | Freeman | H02M 3/07 |
| 2018/0205315 A1* | 7/2018 | Giuliano | H02M 3/07 |
| 2019/0051298 A1* | 2/2019 | Lee | G06F 3/167 |
| 2019/0103766 A1* | 4/2019 | Von Novak, III | H02M 3/1582 |

\* cited by examiner

*Primary Examiner* — Kyle J Moody
*Assistant Examiner* — Jye-June Lee
(74) *Attorney, Agent, or Firm* — Berkeley Law & Technology Group, LLP

(57) ABSTRACT

In a power converter having a regulator and charge pump, both of which operate in plural modes, a controller receives information indicative of the power converter's operation and, based at least in part on said information, causes transitions between regulator modes and transitions between charge-pump modes.

20 Claims, 5 Drawing Sheets

ADAPTIVE CONTROL FOR RECONFIGURING A REGULATOR AND/OR A CHARGE PUMP FOR A POWER CONVERTER

FIELD OF DISCLOSURE

This disclosure relates to power supplies, and in particular, to power supplies that include both switched-capacitor networks and regulators.

BACKGROUND

Certain power converters include a charge pump that is connected to a regulator. Such power converters transform a first voltage into a second voltage by causing a multiple of the first voltage to reach a voltage that is relatively close to the second voltage and by using a regulator to make up the difference.

In the course of operation, the input voltage may change. For example, in a digital device powered by a battery, the battery voltage will tend to decrease over time, whereas the digital circuitry will require some fixed second voltage. Unless something is done, the output voltage may also change. This can lead to the power converter supplying an incorrect voltage.

SUMMARY

In one aspect, the invention concerns adaptively changing the modes of the regulator and the charge pump as conditions change.

In one aspect, the invention features a controller that is configured to control operation of a power converter in which a regulator that is operable in plural regulator-modes connects to a charge pump that is operable in plural charge-pump modes, wherein the controller is configured to receive information indicative of operation of the power converter and, based at least in part on the information, to cause first and second transitions, wherein the first transition is between regulator modes and wherein the second transition is between charge-pump modes.

Among the embodiments of the invention are those in which the controller causes the first and second transitions to be concurrent, or at the same time or substantially the same time, and those in which it causes the first and second transitions serially, or one after the other.

Embodiments include those in which the first transition causes the regulator to transition between operating in buck mode and operating in boost mode and those in which it causes the regulator to transition between two modes selected from the group consisting of buck mode, boost mode, and buck-boost mode.

Also among the embodiments are those in which the second transition causes the charge pump to change a voltage-transformation ratio thereof.

In some embodiments, the controller comprises a state machine that implements logic for causing the first and second transitions. Such embodiments include those in which the state machine is a synchronous Moore finite state machine, those that rely on a Mealy finite state machine, those in which the finite state machine is asynchronous, and those in which the state machine receives a clock signal having an adaptive duration between clock pulses thereof.

Yet other embodiments that include a state machine are those in which there exists a plurality of possible transitions between buck mode and boost mode, some of which the state machine suppresses. As such, the state machine is configured to permit only some of the possible transitions.

In some embodiments, as a result of the first transition, the regulator is only able to increase a voltage provided thereto. In such embodiments, the second transition is permitted if and only if the charge pump's voltage-transformation ratio does not change or increase.

In other embodiments, as a result of the first transition, the regulator is only able to decrease a voltage provided thereto. In these embodiments, the second transition is permitted if and only if the voltage-transformation ratio does not change or decrease.

The invention also includes variants that carry out certain functions upon starting or enabling the power converter or a component thereof.

Among these are embodiments in which, upon starting the power converter, the controller chooses an initial mode of operation for the regulator based at least in part on a state of an output capacitor of the power converter.

Also among these embodiments are those in which, for a selected time interval following either the first and second transitions, the controller ignores information indicative of operation of the power converter.

Additional embodiments include those in which the controller selects the first and second transitions such that a probability of a spurious transition between modes is reduced to below a selected threshold.

Also among the embodiments are those in which the controller responds to faults. These include embodiments in which the controller receives information indicative of a fault and, in response to such information, disables circuitry within the converter. In other ones of these embodiments, the controller receives information indicative of resolution of a fault and, in response, re-enables circuitry within the converter. Embodiments include those in which the circuitry is just the regulator and those in which the circuitry includes both the regulator and the charge pump.

BRIEF DESCRIPTION OF THE DRAWINGS

These and other features and advantages of the invention will be apparent from the following detailed description and the accompanying figures, in which:

FIG. 9 shows a table to indicate modes and voltage-transformation ratios chosen to avoid inflicting voltage-induced stress upon one or more switches in the regulator and or charge pump; and FIG. 10 shows a table to indicate modes and voltage-transformation ratios chosen to promote power converter efficiency.

DETAILED DESCRIPTION

Figure 1:
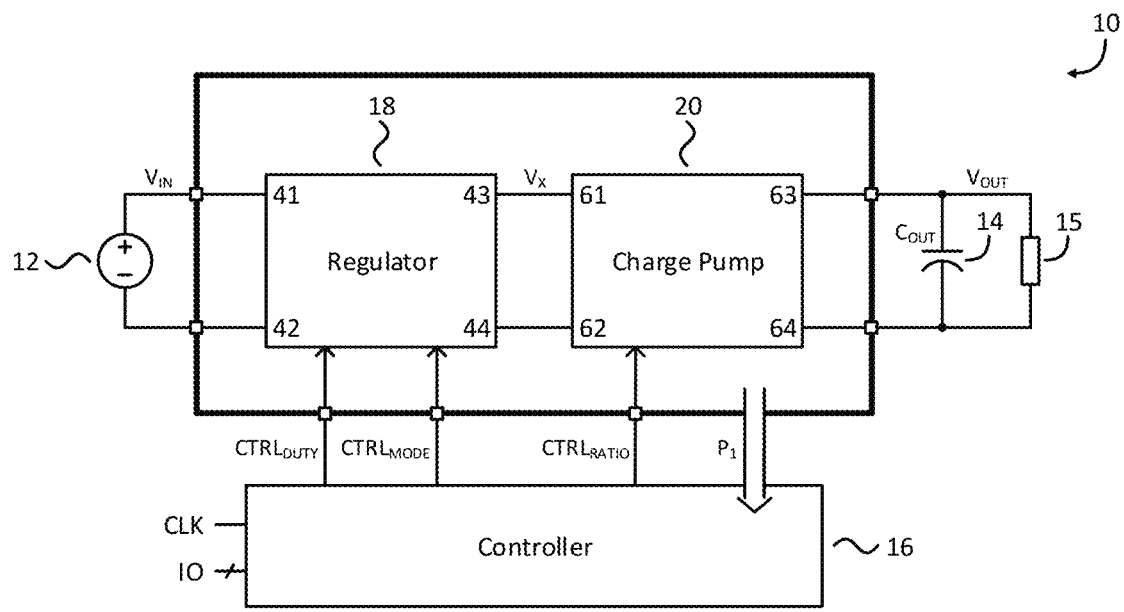
FIG. 1 shows a power converter for stepping up a first voltage.

FIG. 1 shows a power converter 10 for receiving an input voltage $V_{IN}$ provided by a voltage source 12 and transforming it into an output voltage $V_{OUT}$ that is made available at an output capacitor 14 and a load 15 thereof. The power converter 10 includes a controller 16 that controls a regulator 18 and a charge pump 20. As used herein, the term "charge pump" refers to a switched-capacitor network.

The power converter 10 can be a step-up or step-down power converter. In a step-up power converter, the output voltage $V_{OUT}$ exceeds the input voltage $V_{IN}$. In a step-down converter, the converse is true.

In FIG. 1, the power converter 10 is a step-up power converter in which the regulator 18 receives the input voltage $V_{IN}$. It then generates an intermediate voltage $V_X$ and provides that intermediate voltage $V_X$ to the charge pump 20. The intermediate voltage $V_X$ is the input voltage to the charge pump 20. In general, this is not the same as the input voltage to the power converter 10 as a whole.

The charge pump 20 then transforms the intermediate voltage $V_X$ into the output voltage $V_{OUT}$ that is higher than the input voltage $V_{IN}$.

The controller 16 receives a set of input signals and produces a set of output signals. Some of these input signals arrive along a first path $P_1$. These input signals are indicative of the power converter's operation. The controller 16 also receives a clock signal CLK and external signals IO that are either analog or digital. Based upon the signals the controller 16 receives, it produces first, second, and third control-signals $CTRL_{MODE}$, $CTRL_{RATIO}$, $CTRL_{DUTY}$ that together control the operation of the regulator 18 and the charge pump 20.

Figure 2:
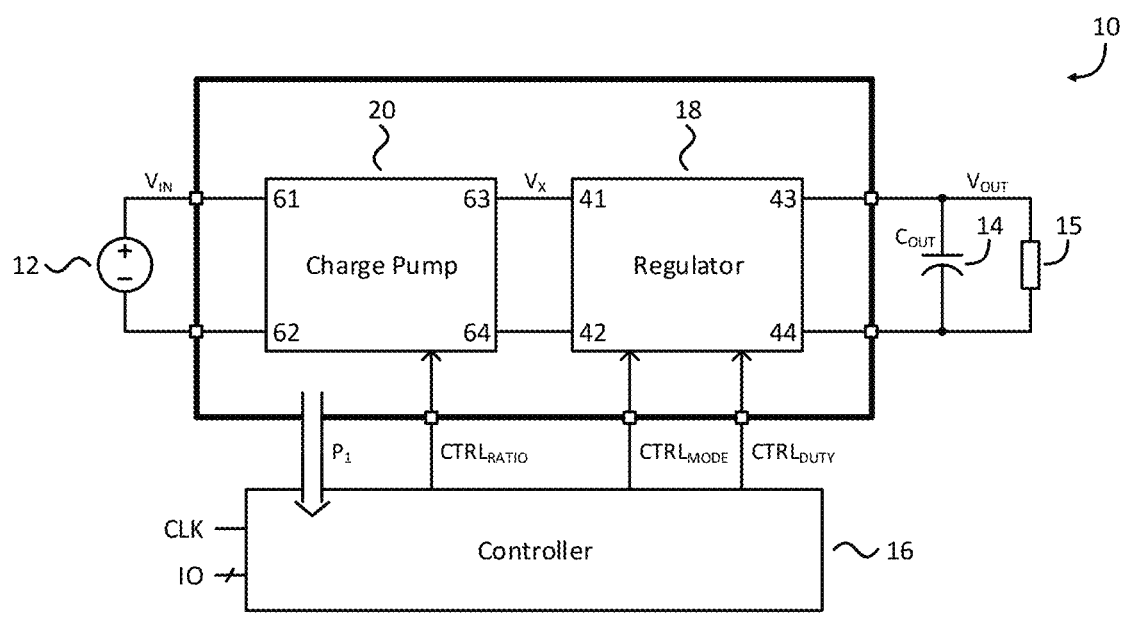
FIG. 2 shows a variant of the power converter shown in FIG. 1 for stepping down a first voltage.

FIG. 2 shows the power converter 10 of FIG. 1 but with certain modifications that cause it to step down its input voltage $V_{IN}$ instead of stepping it up. As was the case in FIG. 1, a controller 16 controls both a regulator 18 and a charge pump 20. However, in FIG. 2, the charge pump 20 receives an input voltage $V_{IN}$ from a voltage source 12. It then generates an intermediate voltage $V_X$ and provides that intermediate voltage $V_X$ to the regulator 18, which transforms it into an output voltage $V_{OUT}$.

In the illustrated embodiment, the regulator 18 is an inductor-based regulator that transitions between different modes of operation in response to a first control-signal, $CTRL_{MODE}$. If the regulator 18 can only reduce its output voltage relative to its input voltage, it is said to be operating in buck mode 26. If the regulator 18 can only increase its output voltage relative to its input voltage, it is said to be operating in boost mode 24. If the regulator 18 can increase, decrease, or even keep its output voltage the same relative to its input voltage, it is said to be in buck-boost mode.

Figure 3:
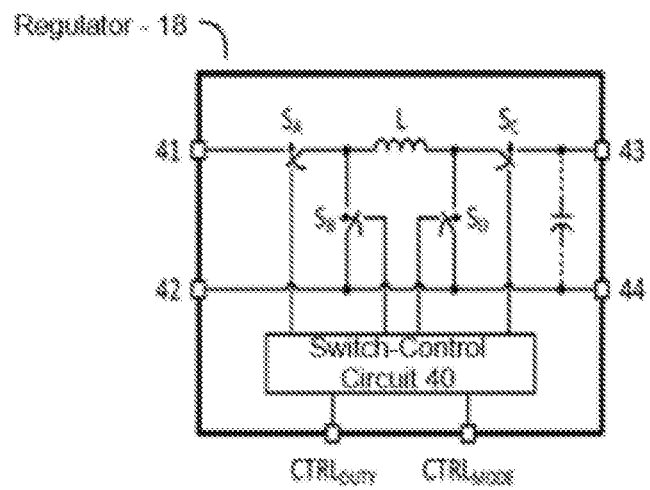
FIG. 3 shows an embodiment of the inductor-based regulator shown in FIGS. 1-2.

FIG. 3 shows an embodiment of the regulator 18 that receives an input voltage across first and second regulator-terminals 41, 42 and produces an output voltage across third and fourth regulator-terminals 43, 44. In addition to an inductor L, the regulator 18 includes first, second, third, and fourth regulator-switches $S_A$, $S_B$, $S_C$, $S_D$. A switch-control circuit 40 controls these switches according to the first control-signal $CTRL_{MODE}$ and the third control-signal $CTRL_{DUTY}$.

When the regulator 18 operates in buck mode 26, the third regulator-switch $S_C$ remains "on" while the fourth regulator-switch $S_D$ remains "off" throughout every switching cycle. The first regulator-switch $S_A$ transitions between being "on" and "off" based on the duty cycle or on-time of the regulator 18 as determined by the third control-signal $CTRL_{DUTY}$. The second regulator-switch $S_B$ may turn on and off so that its state is complementary to that of the first regulator-switch $S_A$. Some implementations of such a regulator 18 omit the fourth regulator-switch $S_D$ and replace the third regulator-switch $S_C$ with a direct connection to the third regulator-terminal 43.

When the regulator 18 operates in boost mode 24, the first regulator-switch $S_A$ remains "on" while the second regulator-switch $S_B$ remains "off" throughout every switching cycle. The fourth regulator-switch $S_D$ transitions between being "on" and "off" according to the duty cycle or on-time of the regulator 18 as determined by the third control-signal $CTRL_{DUTY}$. The third regulator-switch $S_C$ may turn on and off so that its state is complementary to that of the fourth regulator-switch $S_D$. Some implementations reduce the number of switches to just two by omitting the second regulator-switch $S_B$ and replacing the first regulator-switch $S_A$ with a direct connection to first regulator-terminal 41.

When the regulator 18 operates in buck-boost mode, the first, second, third, and fourth regulator switches $S_A$, $S_B$, $S_C$, $S_D$ transition between being "on" and being "off" some at the same time and some at different times during each switching cycle as determined by the third control-signal $CTRL_{DUTY}$. The switch-control circuit 40 controls and sequences transitions of all the regulator switches $S_A$-$S_D$ in such a way as to incorporate any necessary dead-time needed during operation of the first, second, third, and fourth regulator switches $S_A$, $S_B$, $S_C$, $S_D$ according to buck mode 26, boost mode 24 or buck-boost mode as determined by the first control-signal $CTRL_{MODE}$.

The charge pump 20 is either a single or multi-phase charge pump. Examples of such charge pumps include Ladder, Dickson, Series-Parallel, Fibonacci, and Doubler, all of which can be adiabatically charged and configured into multi-phase networks. A particularly useful charge pump is an adiabatically charged version of a full-wave cascade multiplier. However, diabatically charged versions can also be used.

Figure 4:
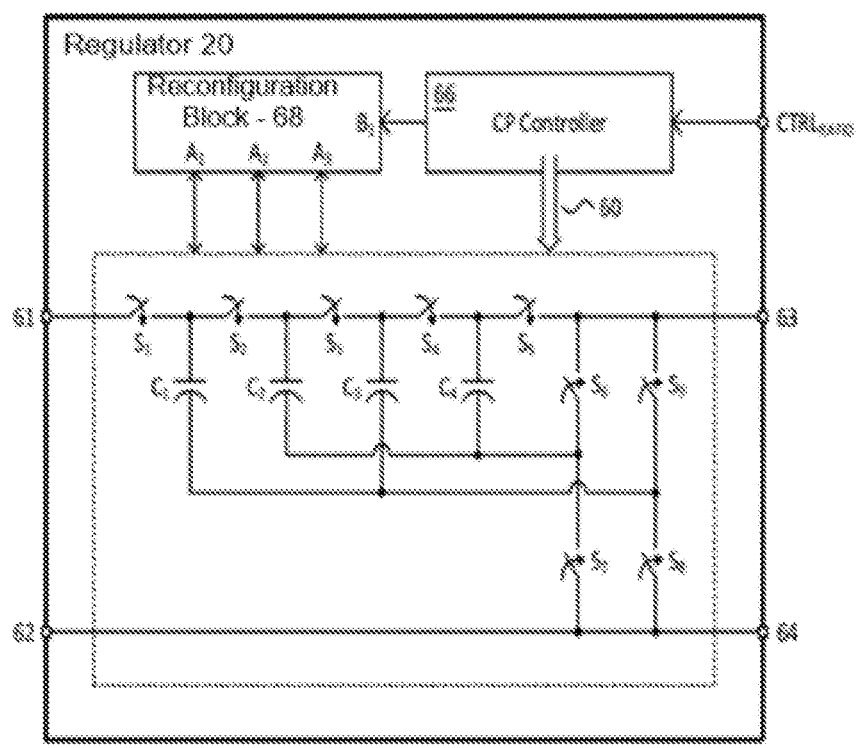
FIG. 4 shows an embodiment of the switched-capacitor network shown in FIGS. 1-2.

FIG. 4 shows an embodiment of the charge pump 20 that receives an input voltage across first and second charge-pump terminals 61, 62 and produces a voltage across third and fourth charge-pump terminals 63, 64. The charge pump 20 is a single-phase symmetric cascade multiplier having first, second, third, fourth, and fifth stack-switches $S_1$, $S_2$, $S_3$, $S_4$, $S_5$, and first, second, third, and fourth phase switches $S_6$, $S_7$, $S_8$, $S_9$. Of these, the first, third, and fifth stack-switches $S_1$, $S_3$, $S_5$ define a set of "odd stack-switches" and the second and fourth stack-switches $S_2$, $S_4$ define a set of "even stack-switches." Similarly, the first and third phase switches $S_6$, $S_8$ define a set of "even phase-switches" and the second and fourth phase-switches $S_7$, $S_9$ define a set of "odd phase-switches."

The charge pump 20 also includes first, second, third, and fourth capacitors $C_1$, $C_2$, $C_3$, $C_4$. Together with the switches, these define stages within the charge pump 20.

The illustrated charge pump 20 has four stages. Each stage includes one of the capacitors $C_1$, $C_2$, $C_3$, $C_4$ and one of four corresponding stack-switches $S_1$, $S_2$, $S_3$, $S_4$. The first stage includes the first stack-switch $S_1$ and the first capacitor $C_1$; the second stage includes the second stack-switch $S_2$ and the second capacitor $C_2$; the third stage includes the third stack-switch $S_3$ and the third capacitor $C_3$; and the fourth stage includes the fourth stack-switch $S_4$ and the fourth capacitor $C_4$. In the embodiment shown in FIG. 4, the maximum voltage-transformation ratio is five because there are four stages.

In response to receiving the second control signal $CTRL_{RATIO}$, a charge-pump controller 66 places operation control-signals on a control-signal path 60. These operation control-signals cause the first, second, third, fourth, and fifth stack-switches $S_1$, $S_2$, $S_3$, $S_4$, $S_5$ and the first, second, third, and fourth phase switches $S_6$, $S_7$, $S_8$, $S_9$ to change states according to a specific sequence. As a result, the charge pump 20 repeatedly transitions between first and second operating-states at a specific frequency.

For example, during a first operating-state, the charge-pump controller 66 closes the odd stack-switches $S_1$, $S_3$, $S_5$ and the odd phase switches $S_7$, $S_9$ and opens the even stack-switches $S_2$, $S_4$. In contrast, during a second operating-state, the charge-pump controller 66 opens the odd stack-switches $S_1$, $S_3$, $S_5$ and the odd phase-switches $S_7$, $S_9$ and closes the even stack-switches $S_2$, $S_4$ and the even phase-switches $S_6$, $S_8$.

In addition, the charge-pump controller 66 transmits reconfiguration control-signals to a reconfiguration input terminal B1 of a reconfiguration block 68. In response, the reconfiguration block 68 provides reconfiguration signals at its reconfiguration output terminals $A_1$-$A_3$. These reconfiguration signals alter the connections between the capacitors $C_1$-$C_4$ in the first and second state.

The charge pump 20 is one that can be reconfigured such that the voltage-transformation ratio of the charge pump 20 changes. The charge pump 20 transitions between different voltage-transformation ratios in response to the second control-signal $CTRL_{RATIO}$. Each such voltage-transformation ratio defines a charge pump mode.

Suitable regulators and charge pumps are described in detail in U.S. Pat. Nos. 8,860,396, 8,743,553, 8,723,491, 8,503,203, 8,693,224, 8,724,353, 8,619,445, 9,203,299, 9,742,266, 9,041,459, U.S. Publication No. 2017/0085172, U.S. Pat. Nos. 9,887,622, 9,882,471, PCT Publication No. WO2017161368, PCT Publication No. WO2017/091696, PCT Publication No. WO2017/143044, PCT Publication No. WO2017/160821, PCT Publication No. WO2017/156532, PCT Publication No. WO2017/196826, and U.S. Publication No. 2017/0244318.

The charge pumps and regulators described in the above-mentioned references have switches that open and close in the normal course of operation. The act of opening and closing these switches does not amount to changing the mode. The term "reconfiguration" expressly excludes the opening and closing of these switches during normal operation. The opening and closing of such switches during normal operation can be used to achieve numerous functions. Among the more common functions are achieving a particular voltage-transformation ratio and regulating a voltage, current and power flow for the purpose of causing a selected voltage-transformation ratio or for causing voltage regulation.

In the context of the regulator 18, the term "mode" shall be construed such that the mere act of closing or opening a switch in the regulator 18 would not necessarily amount to a change in "mode." For example, merely changing duty cycle of the switch does not result in a change in "mode." Similarly, when any switch in a regulator, either alone or in combination with other switches, transitions between being open and closed, this would not necessarily mean that the regulator 18 has transitioned between two modes.

The ability to reconfigure either or both the regulator 18 and the charge pump 20 provides a way to expand the operating range of the power converter 10. The regulator 18 has only a finite operating range. Therefore, for a given charge pump mode, the extent to which the regulator 18 is required to regulate could surpass its operating range. By changing the charge pump's operating mode, it becomes possible to reduce the demands on the regulator 18 so that the regulator 18 can continue to operate within its operating range. This, in turn, expands the operating range of the power converter 10 as a whole.

In general, the output voltage $V_{OUT}$ is the result of having carried out first and second voltage-transformations. The regulator 18 carries out the first voltage-transformation and the charge pump 20 carries out the second voltage-transformation. The ordinal adjectives "first" and "second" are not meant to imply that one comes before the other. As is apparent from comparing FIGS. 1 and 2, the regulator 18 can be placed on either side of the charge pump 20.

There are many paths to the same output voltage $V_{OUT}$. These paths differ in the relative contributions by the charge pump 20 and the regulator 18. Although they all arrive at the same output voltage V OUT, these paths are not equivalent in every way.

For example, certain combinations of first and second voltage-transformations may cause a transistor that implements a switch to sustain voltages that are above its rating. To avoid this, it would be useful to transition the charge pump 20 into a mode that has a high enough voltage-transformation ratio so that the voltage across the transistor remains below its upper limit.

Certain combinations of first and second voltage-transformations also result in lower efficiency. For example, given a particular output voltage $V_{OUT}$, it is usually more efficient to have most of that output voltage $V_{OUT}$ be the result of the charge pump's activity rather than that of the regulator 18. Thus, it is preferable to choose the combination that offers this feature.

On the other hand, under some circumstances, it is undesirable to change the direction of voltage transformation. The disadvantages of doing so may be enough so that one is willing to have the regulator 18 carry out a larger voltage-transformation than a simple mathematical analysis would indicate is necessary.

For example, in a step-up version of the power converter 10, it may be that the regulator 18 will carry out a smaller voltage-transformation if the charge pump 20 overshoots the target voltage and the regulator 18 operates in buck mode 26 to take the voltage down by a small amount. Nevertheless, it may be more efficient, depending on the circumstances, to have the charge pump 20 step up the voltage to a value somewhat below the target value and to have the regulator 18 boost it the rest of the way. This may be the case even if the magnitude of the regulator's boosting is slightly more than the magnitude of the regulator's bucking would have been had the charge pump 20 been made to overshoot the target value. Doing so avoids inefficiencies that arise when the regulator 18 and charge pump 20 are not carrying out voltage transformation in the same direction.

Different paths to the same target output voltage $V_{OUT}$ may result in poorer regulation accuracy than other paths. Other paths to the same target output voltage $V_{OUT}$ may cause the regulator 18 to operate in an under-voltage or over-voltage condition. It is therefore useful to cause the first and second control-signals $CTRL_{MODE}$, $CTRL_{RATIO}$ to choose an appropriate voltage-transformation ratio for the charge pump 20 and also an appropriate mode for the regulator 18.

Additionally, different paths to the same target output voltage $V_{OUT}$ may result in the regulator 18 having to regulate the voltage in such a way that the regulator's output is very close to, and in some cases equal to, its input voltage. This is best carried out by operating the regulator 18 in buck-boost mode.

Although it is able to regulate the output voltage $V_{OUT}$ accurately, the regulator 18, when operating in buck-boost mode, causes all four switches to change state during each cycle of operation. Having so many switches changing states tends to promote inefficiency. Thus, it tends to be preferable to operate in either buck mode 26 or boost mode 24, where only two of the regulator's switches change states with each cycle of operation.

It is therefore useful to avoid operating the regulator 18 in buck-boost mode whenever possible. This can be done by providing the controller 16 with two degrees-of-freedom. In particular, using the first and second control-signals $CTRL_{MODE}$, $CTRL_{RATIO}$, the controller 16 chooses an appropriate voltage-transformation ratio for the charge pump 20 and also an appropriate mode for the regulator 18. This allows the regulator 18 to favor operation in either buck mode 26 or boost mode 24, thus avoiding unnecessary operation in the less efficient buck-boost mode. The ability to avoid such unnecessary operation in buck-boost mode arises because the controller has the ability to also choose a corresponding charge pump voltage-transformation ratio that helps maintain sufficient voltage difference between the regulator input and output voltages for either mode.

For a step-down version of the power converter 10, as shown in FIG. 2, the ability to reconfigure either or both the regulator 18 and the charge pump 20 provides similar benefits in expanding the operating range, operating within transistor voltage ratings or allowing the use of low-voltage transistors as switches. Depending on the circumstances, it may be more efficient for the regulator 18 to operate in buck mode 26. Doing so means that the voltage transformation throughout the step-down power converter 10 is carried out in the same direction.

For a given input voltage $V_{IN}$ and output voltage $V_{OUT}$, increasing the voltage-transformation ratio of the charge pump 20 reduces the intermediate voltage $V_X$ to regulator 18. This necessitates a higher steady-state duty cycle in buck mode 26 in order to maintain regulation at the output voltage $V_{OUT}$. Conversely, decreasing the voltage-transformation ratio of charge pump 20 increases the intermediate voltage $V_X$ to regulator 18. This necessitates a lower steady-state duty cycle in buck mode 26 in order to maintain regulation.

Depending on the magnitude of the load 15 applied at the output voltage $V_{OUT}$, as well as the values of various components (e.g., inductor L, charge pump capacitors $C_1$-$C_4$, etc.) used in the power converter 10, it may be more efficient for the regulator 18 in buck mode 26 to operate at a higher duty cycle. It is therefore useful to cause the first and second control-signals $CTRL_{MODE}$, $CTRL_{RATIO}$ to choose an appropriate voltage-transformation ratio for the charge pump 20 and also an appropriate mode for the regulator 18 to maximize efficiency according to load conditions and/or component value selection.

Although efficiency is a desirable feature, it is not the only desirable feature. There are times when it may be desirable to give up some efficiency to gain a different performance advantage.

As one example, when operating the regulator 18 shown in FIG. 2 in buck mode 26, the charge pump 20 outputs a voltage that is lower than its input voltage. How much lower depends on its voltage-transformation ratio of the charge pump 20. Therefore, increasing the charge pump's voltage-transformation ratio reduces its output voltage further, thus also reducing the intermediate voltage $V_X$ to the regulator 18. This, in turn, reduces the differential voltage (i.e., $V_X$-$V_{OUT}$) across the inductor L during the buck on-time. Since the rate-of-change of current through the inductor L depends on the voltage difference across it (i.e., $V_X$-$V_{OUT}$), a reduced differential voltage across the inductor L hinders the inductor's ability to rapidly deliver current on demand. Thus, if the load 15 were to suddenly increase, the reduced differential voltage across the inductor L would limit its current build-up or slew rate. Since this would be relied upon to rapidly supply the new higher load 15, the output voltage $V_{OUT}$ may fall short of what it should be.

To avoid this difficulty, it is desirable in such cases to decrease the voltage-transformation ratio of the charge pump 20. Doing so increases the intermediate voltage $V_X$ to the regulator 18, which will then increase the differential voltage across the inductor L during the buck on-time. This larger differential-voltage across the inductor L gives it the higher slew-rate it needs to rapidly respond to a sudden change in an output load. This, in turn, reduces any undershoot in output-voltage $V_{OUT}$ that might otherwise occur.

In such cases, it may be desirable to sacrifice efficiency in favor of rapid response. The controller 16 as described offers the versatility to make such a trade-off. It does so by permitting the first and second control-signals $CTRL_{MODE}$, $CTRL_{RATIO}$ to choose an appropriate voltage-transformation ratio for the charge pump 20 and also an appropriate mode for the regulator 18 in such a way as to favor such transient response performance over efficiency or vice versa.

Figure 5:
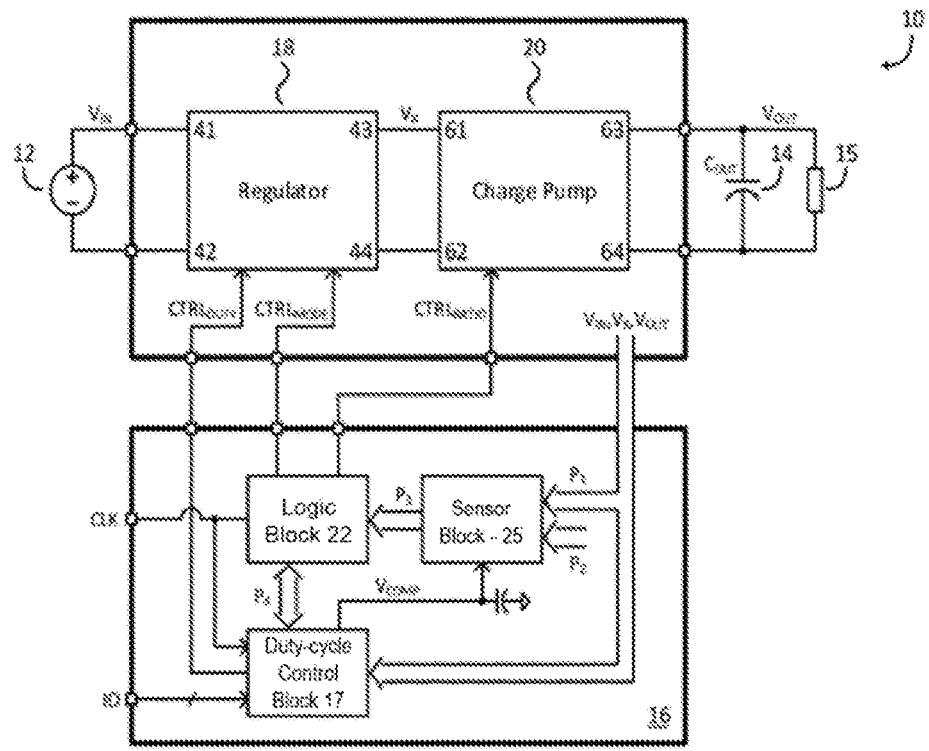
FIG. 5 shows an embodiment of the controller shown in FIGS. 1-2.

As shown in FIG. 5, the controller 16 features a logic block 22, a sensor block 25, and a duty-cycle control-block 17. In some embodiments, an A/D converter implements the sensor block 25 and a state machine implements the logic block 22. These structures cooperate to enable the controller 16 to determine those modes of the regulator 18 and the charge pump 20 that best meet the user's performance requirements.

The controller 16 receives a clock signal CLK, external signals IO. In addition, the controller 16 receives a first set of operation signals along a first path $P_1$. The operation signals in the first set can be analog signals indicative of the power converter's operation. In the illustrated embodiment, the first set of operation signals includes the input voltage $V_{IN}$, the intermediate voltage $V_X$, and the output voltage $V_{OUT}$. Whether or not all of these signals are used depends on the circuits implemented by the sensor block 25 and the duty-cycle control-block 17.

At each clock pulse, the logic block 22 receives signals from the sensor block 25 and/or the duty-cycle control-block 17 and passes along updated first and second control-signals $CTRL_{MODE}$, $CTRLR_{RATIO}$. The sensor block 25 receives the first set of operation signals along the first path $P_1$, a second set of operation signals along a second path $P_2$, and passes a third set of operation signals along a third path $P_3$ to the logic block 22. Whether or not the sensor block 25 uses both first and second sets of operational signals or all the signals within each set depends on the circuits implemented within the sensor block 25.

The duty-cycle control-block 17 performs the actual task of regulating the output voltage $V_{OUT}$. It receives the first set of operation signals along the first path $P_1$, the clock signal CLK, the external signals IO, and signals along a bi-directional path $P_4$. Whether or not all of these signals are used depends on the circuits implemented by the duty-cycle control-block 17. The duty-cycle control-block 17 generates, as its output, the third control-signal $CTRL_{DUTY}$. The regulator 18 receives the third control-signal $CTRL_{DUTY}$ from the duty-cycle control-block 17 and proceeds to operate with a duty cycle as specified by the third control-signal $CTRL_{DUTY}$. The duty-cycle control-block 17 is therefore part of the feedback control loop for the regulator 18.

The duty-cycle control-block 17 also produces a compensation voltage $V_{COMP}$ across a compensation capacitor, as shown in FIG. 5. The sensor block 25 receives this compensation voltage $V_{COMP}$ at a compensation input thereof.

In the particular embodiment shown in FIG. 5, the duty-cycle control-block 17 also sends output signals along the bi-directional path $P_4$ to the logic block 22 for further optimization or tuning of the first and second control-signals $CTRL_{MODE}$, $CTRL_{RATIO}$.

There are many control methods for implementing the regulating function of the power converter 10. The choice of a particular control method in turn dictates the implementation of the duty-cycle control-block 17. Depending upon the selected control method, the control loop may be linear or non-linear and the operating frequency may be fixed or variable. Linear controllers include voltage-mode, peak current-mode, valley current-mode, and average current-mode. Non-linear controllers include $V^2$, hysteretic, constant off-time, constant on-time, sliding, and boundary. To improve the performance at different operating conditions, additional control methods can be used in conjunction with the primary control method. For example, to improve light load performance, frequency foldback or pulse skipping can be used.

Alternative embodiments include additional operation signals, examples of which include, inductor current, and phase node current. These can improve decision-making accuracy at the expense of more die area or increased complexity. In yet other embodiments, the inputs also include fault-detection circuitry, such as boost current limit and VX under-voltage fault indicators. In such embodiments, the controller 16 disables some or all components of the power converter 10 upon detection of a fault and re-enables some or all components upon detecting the resolution of the fault. For example, the components in question could include just the regulator 18 or both the regulator 18 and the charge pump 20.

For ease of implementation and operational robustness, the logic block 22 is a synchronous Moore finite state machine that receives the clock signal CLK and uses it to synchronize the first and second output signals with the operation signals. However, other implementations are possible. For instance, some implementations are asynchronous. Others rely on a Mealy finite state machine rather than a Moore finite state machine.

At every occurrence of a clock pulse, the logic block 22 generates the first and second control-signals $CTRL_{MODE}$, $CTRL_{RATIO}$. The first and second control-signals $CTRL_{MODE}$, $CTRL_{RATIO}$ can change at the same time or at different times.

The controller 16 provides the first control-signal, $CTRL_{MODE}$, to the regulator 18. Depending on the first control-signal $CTRL_{MODE}$, the regulator 18 changes its operating mode or stays in the same mode.

The controller 16 provides the second control-signal $CTRL_{RATIO}$ to the charge pump 20. Depending on the second control-signal $CTRL_{RATIO}$, the voltage-transformation ratio of the charge pump 20 either changes or remains the same. The second control-signal $CTRL_{RATIO}$ selects a voltage-transformation ratio from a set of available voltage-transformation ratios.

Figure 6:
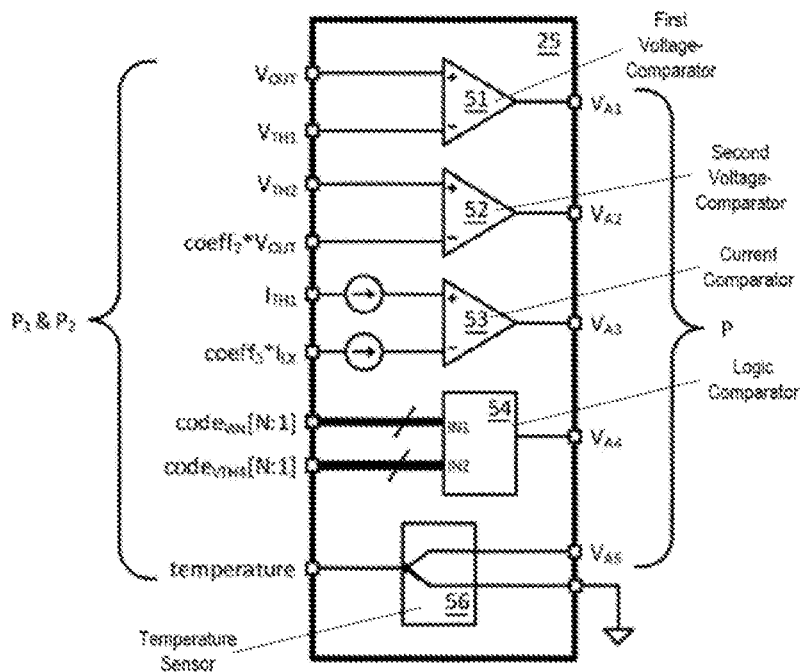
FIG. 6 shows an embodiment of the sensor block shown in FIG. 5.

FIG. 6 shows an alternative embodiment of the sensor block 25. The illustrated sensor block 25 produces five voltages $V_{A1}$, $V_{A2}$, $V_{A3}$, $V_{A4}$, $V_{A5}$ that switch between logic low and logic high levels. These five voltages can be used as indicator inputs to the state machine or logic block 22. The sensor block 25 receives multiple signals: voltages $V_{OUT}$, $V_{TH1}$-$V_{TH2}$; currents $I_{TH1}$, $I_{LX}$; binary codes or words that are N-bits long (where N is an integer) $code_{VIN}[N:1]$, $code_{VTH4}[N:1]$; and signals indicative of temperature internal or external to the power converter 10. Circuits between the various inputs and outputs of the sensor block 25 convert each the various inputs into corresponding outputs or indicators for use by the logic block 22. These circuits include a first voltage-comparator 51, a second voltage-comparator 52, a current comparator 53, a logic comparator 54, and a temperature sensor 56. The first voltage-comparator 51 compares the output voltage $V_{OUT}$ and a first threshold-voltage $V_{TH1}$ and outputs the voltage VAT indicative of whether or not the output voltage $V_{OUT}$ is greater than the first threshold voltage $V_{TH1}$.

The second voltage-comparator 52 monitors a scaled version of the output voltage $V_{OUT}$ and outputs the voltage $V_{A2}$ that indicates whether or not the scaled version of the output voltage $V_{OUT}$ is greater than the second threshold voltage $V_{TH2}$. The scaled version of the output voltage $V_{OUT}$ is equal to the product of the output voltage and a numerical coefficient $coeff_2$ that can be equal to, greater than, or less than 1.0.

The current comparator 53 compares a scaled version of the inductor current $I_{LX}$ and the threshold current $I_{TH1}$ and produces the voltage $V_{A3}$ whose value indicates whether or not the scaled version of the inductor current $I_{LX}$ is less than the threshold current $I_{TH1}$. The scaled version of the inductor current $I_{LX}$ that is equal to the product of the inductor current $I_{LX}$ and a scalar coefficient $coeff_3$ selected from one of three intervals: ($coeff_3 < 1$), ($coeff_3 > 1$), and ($coeff_3 = 1$).

The digital or logic comparator 54 receives, as inputs thereof, binary codes or words that are N-bits long (where N is an integer) $code_{VIN}[N:1]$ and $code_{VTH4}[N:1]$. Each code or word is a binary representation of information indicative of the operating conditions of one or more of the regulator 18, the charge pump 20, and the state or magnitude of various nodes in the overall power converter 10. The logic comparator 54 performs a digital or binary comparison between its inputs and outputs the voltage $V_{A4}$. This voltage $V_{A4}$ indicates a logical relationship between the inputs of the logic comparator 54.

The temperature sensor 56 receives a signal indicative of temperature. In some embodiments, the temperature sensor 56 receives, as an input, a temperature internal or external to the power converter 10. The output of the temperature sensor 56 is voltage $V_{A5}$ that indicates whether the temperature is above, below, or at a predetermined temperature threshold.

Since optical energy can be viewed as having an equivalent temperature, some embodiments feature a temperature sensor 56 implemented as a photodiode or light sensor. In such cases, the sensor receives, as an input, light external to the power converter 10. This permits the controller 16 to change modes in response to a comparison between ambient light levels and a predetermined threshold.

Figure 7:
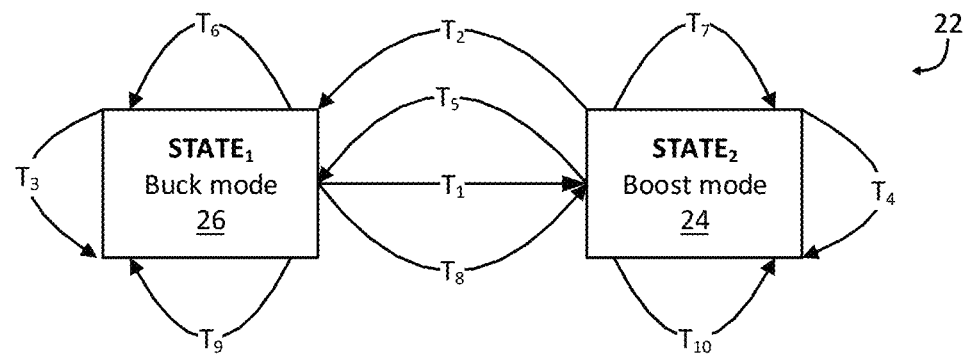
FIG. 7 shows state transitions during steady-state operation of the power converter shown in FIG. 1.

FIG. 7 shows state transitions implemented by the logic block 22 when the power converter 10 operates in steady state. In the particular example shown, the regulator 18 has two modes: a boost mode 24 and a buck mode 26. The first and second control-signals $CTRL_{MODE}$, $CTRL_{RATIO}$ define the transition.

The first control-signal $CTRL_{MODE}$ indicates whether the regulator's mode should change. Since there are only two possible modes indicated in FIG. 7, the first control-signal $CTRL_{MODE}$ is binary. The second control signal $CTRL_{RATIO}$ indicates whether or not the charge pump 20 should change mode. The second control-signal $CTRL_{RATIO}$ is thus a trinary variable to indicate whether the voltage-transformation ratio should increase, decrease, or remain the same. In an alternative implementation, the second control-signal $CTRL_{RATIO}$ includes information indicative of the desired voltage-transformation ratio. In such implementations, it is possible to jump directly to the desired voltage-transformation ratio.

For a given state of the regulator 18, certain state transitions T3, T6, T9, T4, T7, T10 cause the regulator 18 to remain in that same state at the next clock pulse. When remaining in the same regulator state, certain transitions T3, T4 also leave the charge pump 20 in the same state, or voltage-transformation ratio. Other transitions T6, T7 keep the regulator 18 in the same state while increasing the charge pump's voltage-transformation ratio. Yet other transitions T9, T10 keep the regulator 18 in the same state while decreasing the charge pump's voltage-transformation ratio.

On the other hand, for a given state of the regulator 18, certain other state transitions T1, T2, T5, T8 change the regulator's mode at the next clock pulse. However, the logic block 22 shown in FIG. 5 curtails the freedom to also reconfigure the charge pump 20. In particular, the logic block 22 forbids state transitions that would result in changing the voltage-transformation ratio in a forbidden direction.

For the FIG. 1 example of a step-up converter, when the regulator 18 operates in buck mode 26, there exists a state transition T1 into boost mode 24 while keeping the voltage-transformation ratio of the charge pump 20 constant. There also exists a state transition T8 into boost mode 24 while decreasing the voltage-transformation ratio. On the other hand, there is no transition into boost mode 24 while simultaneously increasing the voltage-transformation ratio.

Conversely, when the regulator 18 operates in boost mode 24, there exists a state transition T2 into buck mode 26 while keeping the voltage-transformation ratio of the charge pump 20 constant. There also exists a state transition T5 into buck mode 26 while increasing the voltage-transformation ratio. On the other hand, there is no transition into buck mode 26 while simultaneously decreasing the voltage-transformation ratio.

As an example, suppose that the power converter 10 shown in FIG. 1 is producing an output voltage $V_{OUT}$ that is higher than a given input voltage $V_{IN}$. If the regulator 18 is in buck mode 26, transitions to boost mode 24 are allowed if the voltage-transformation ratio of the charge pump 20 is kept constant or decreased since decreasing the voltage-transformation ratio of the charge pump 20 increases the intermediate voltage $V_X$ at the output of the regulator 18. Conversely, if the regulator 18 is in boost mode 24, transitions to buck mode 26 are allowed if the voltage-transformation ratio of the charge pump 20 is kept constant or increased since increasing the voltage-transformation ratio of the charge pump 20 decreases the intermediate voltage $V_X$ at the output of the regulator 18.

As another example, suppose that the power converter 10 in FIG. 2 is producing an output voltage $V_{OUT}$ that is lower than a given input voltage $V_{IN}$. If the regulator 18 is in buck mode 26, transitions to boost mode 24 are allowed if the voltage-transformation ratio of the charge pump 20 is kept constant, or increased since increasing the voltage-transformation ratio of the charge pump 20 decreases the intermediate voltage $V_X$ at the input to the regulator 18. Conversely, if the regulator 18 is in boost mode 24, transitions to buck mode 26 are allowed if the voltage-transformation ratio of the charge pump 20 is kept constant, or decreased since decreasing the voltage-transformation ratio of the charge pump 20 increases the intermediate voltage $V_X$ at the input to the regulator 18.

As shown in FIG. 7, the logic block 22 determines if and when the regulator 18 that is in one mode should change to another mode. However, the state transitions shown in FIG. 7 do not specify which of the two modes 24, 26 should be selected when first starting power converter operation.

When the power converter 10 is powered up again after having been shut down, some mechanism must determine what mode the regulator 18 should start off with. Until then, it will not be possible to operate the logic block 22 according to the state changes shown in FIG. 7.

One solution is to arbitrarily assign the regulator's starting mode. A suitable choice is buck mode 26. One can then rely on the logic block 22 executing the state changes shown in FIG. 7 to correct the mode as needed.

Another approach is to inspect the output capacitor 14 at start-up and assign the regulator's initial mode based on that inspection.

When the power converter 10 shuts off, the charge on the output capacitor 14 does not necessarily disappear. In some cases, it may persist. In such cases, it may be possible to start directly in boost mode 24 instead of starting in buck mode 26. In other cases, the power converter 10 will discharge the output capacitor 14 as part of the shutdown process. In those cases, it may be preferable to start in buck mode 26 and to later transition into boost mode 24.

For the controller 16 to be adaptable to each type of power converter 10, it is useful to provide the logic block 22 with logic to choose the regulator's starting mode based at least in part on the state of the output capacitor 14 at start-up.

Figure 8:
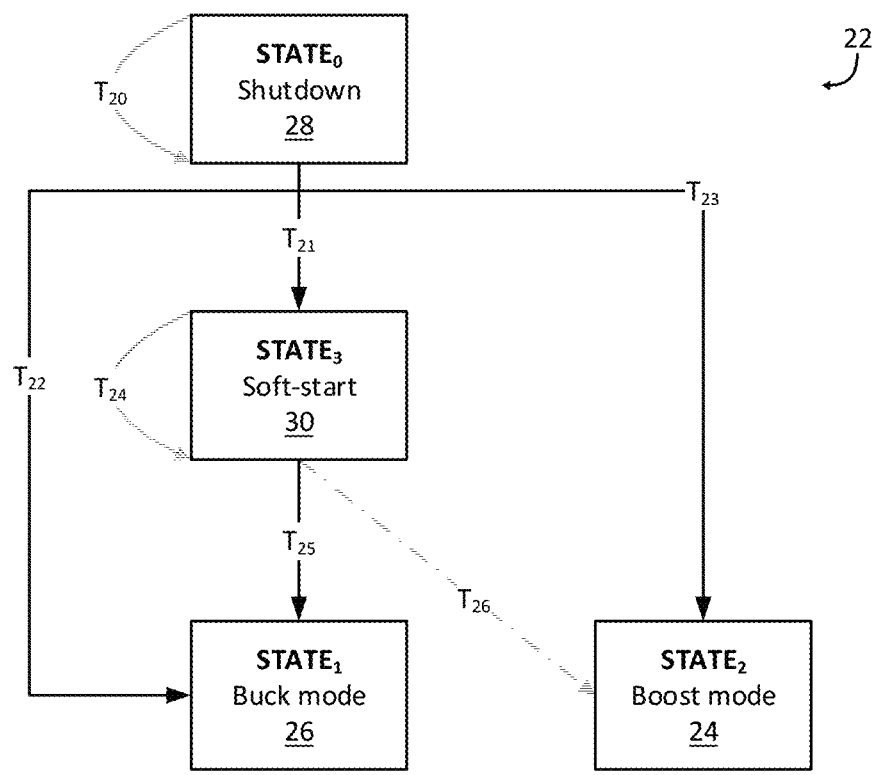
FIG. 8 shows the state transitions of FIG. 7 embedded in a larger state machine that is used for additional operations such as startup, soft-start, shutdown, and/or fault protection.

FIG. 8 shows a shutdown state 28 and a soft-start state 30. FIG. 8 also includes the buck mode 26 and the boost mode 24 states shown in FIG. 7. State transitions that have already been shown in FIG. 7 have been omitted for clarity since those state transitions only pertain to steady-state operation.

When the power converter 10 is in the shutdown state 28, it can either remain in the shutdown state 28 or transition into the soft-start state 30 depending on other state machine inputs. These other state machine inputs include, for example, whether the power converter 10 has been enabled or disabled or whether there are any existing faults. FIG. 8 shows a state transition T20 in which the power converter 10 remains in the shutdown state 28. In this case, there is no need to change either the voltage-transformation ratio or the regulator mode. Hence, this state transition T20 does not requires a change in either voltage-transformation ratio or the regulator mode.

Upon being enabled, the power converter 10 determines whether there is charge present at the output capacitor 14 and the relationship of that charge to other voltages within the power converter 10, such as the intermediate voltage $V_X$ or the input voltage $V_{IN}$. This relationship can be determined in several ways. In some embodiments, the controller 16 receives a measurement of the intermediate voltage $V_X$ or the input voltage $V_{IN}$. In other embodiments, there exists a known relationship between the voltage at the output capacitor 14 and the intermediate voltage $V_X$. Among these are embodiments in which the charge pump 20 defaults to an initial charge-pump ratio at startup. In that case, the intermediate voltage $V_X$ can easily be inferred from the voltage at the output capacitor 14.

If the charge present causes the intermediate voltage $V_X$ to be lower than the input voltage $V_{IN}$, a state transition T22 starts the regulator 18 in buck mode 26. Otherwise if the charge present causes the intermediate voltage $V_X$ to be higher than the input voltage $V_{IN}$, a state transition T23 starts the regulator 18 in boost mode 24. Further operation continues according to FIG. 7.

Some embodiments feature a transition T21 from the shutdown state 28 to a soft-start state 30. This transition T21 assigns the regulator 18 a default starting-mode such as buck mode 26 if the output capacitor 14 is detected to be fully discharged upon power converter enable. Once in the soft-start state 30, the logic block 22 periodically inspects the output capacitor 14. If the charge on the output capacitor 14 is such that the default mode is found to be optimal, the logic block 22 executes a transition T24 that maintains the status quo. Otherwise, the state machine executes either a transition T25 maintaining the regulator mode as buck mode 26, with no change to the charge pump's voltage-transformation ratio, or a transition T26 into boost mode 24, but with a decrease in the voltage-transformation ratio.

Figures 9, 10:
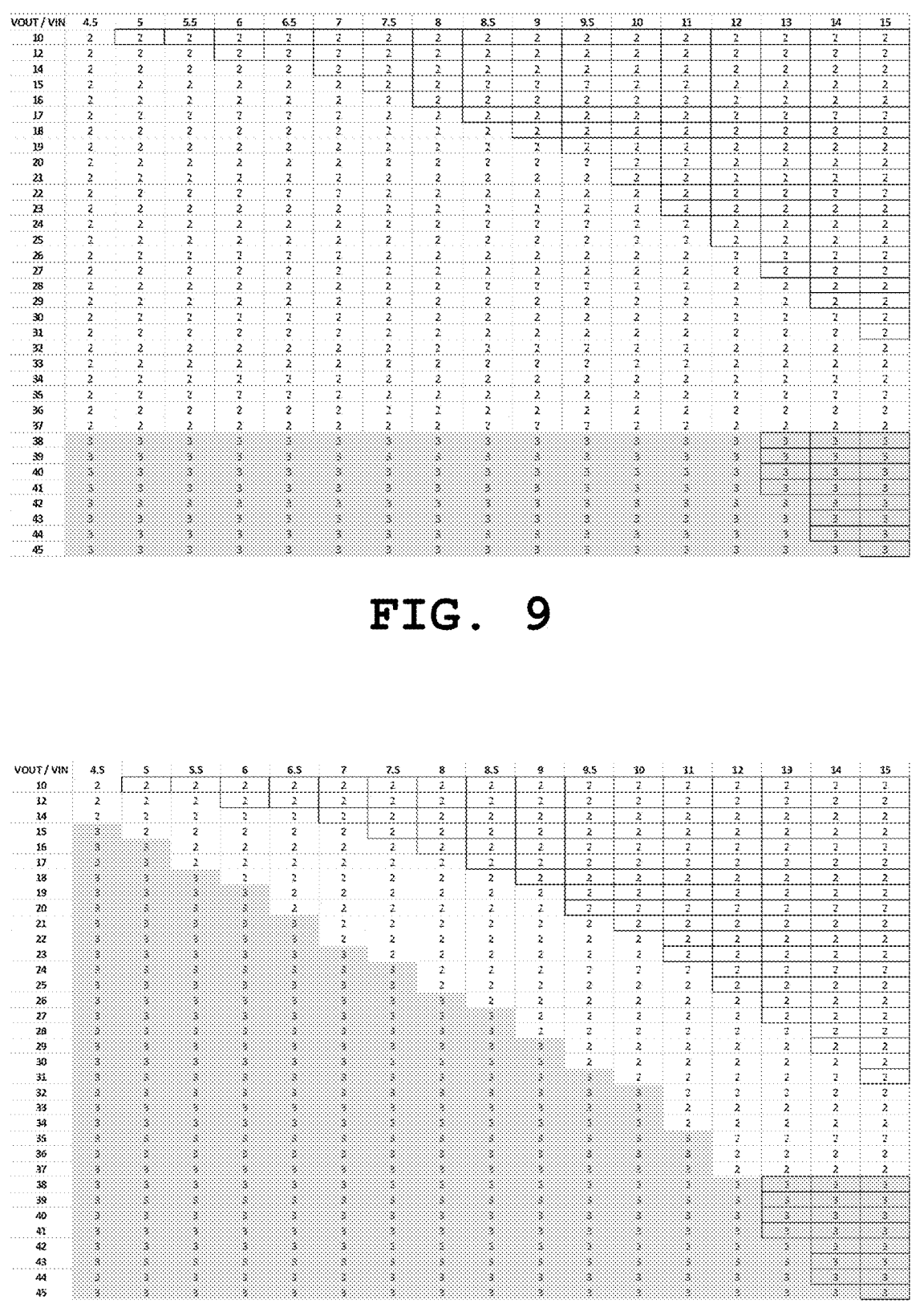

FIGS. 9 and 10 show tables for a step-up power converter that is intended to operate across a range of input voltages $V_{IN}$ from 4.5 volts to 15 volts and to provide an output voltage $V_{OUT}$ in the range between 10 volts and 45 volts. Each cell in the table corresponds to a particular input voltage $V_{IN}$ and a corresponding desired output voltage $V_{OUT}$. For each such combination, the logic block 22 is expected to designate the charge pump's mode and the regulator's mode. In this example, logic block 22 can also be implemented using a look-up table or memory.

The charge pump 20 corresponding to FIGS. 9-10 is assumed to have two modes: a first mode in which it doubles the voltage at its input and a second mode in which it triples the voltage at its input. The input to the charge pump 20 is the intermediate voltage VX.

In general, the charge pump 20 operates more efficiently when tripling its input than when doubling its input. The shaded cells correspond to those in which the charge pump 20 operates in this more efficient mode. In FIG. 9 the logic block 22 implements logic that chooses modes solely to avoid imposing an output voltage $V_{OUT}$ voltage greater than 37.5 volts, or 18.75V across the regulator and charge pump transistors when the charge pump 20 is doubling its input voltage. In FIG. 10, the logic block 22 implements logic that adds the additional constraint of choosing the more efficient charge-pump mode when possible. As is apparent from inspection, the shaded cells predominate in FIG. 10 but not in FIG. 9. This results in greater efficiency over more of the power converter's operating range.

A difficulty that can arise in connection with changing the mode is mode oscillation. Mode oscillation can arise because, for a brief period after the mode has been changed, the first set of operation signals can have significant transients or require significant settling time. This can cause the controller 16 to mistakenly regard the mode as having to be changed again. It will then provide new first and second control-signals $CTRL_{MODE}$, $CTRL_{RATIO}$, immediately or very soon after the first mode change thus compounding the problem by causing another round of signal transients. This can result in spurious mode changes or even mode oscillation that lasts indefinitely.

One way to suppress the possibility of mode oscillation is to impose a blackout period during which the new mode is frozen. This can be achieved by causing the controller 16 to ignore the second set of operation signals for some limited period. One way to achieve this is to adaptively control the clock pulses provided to the controller 16 such that, immediately after a mode change, the next clock pulse is delayed by the desired blackout period.

Another way to suppress the possibility of mode oscillation is to avoid a mode change that will result in an intermediate voltage $V_X$ that is outside the regulator's ability to regulate. For example, in a transition from buck mode 26 to boost mode 24, one should avoid a reconfiguration event such as staying with or changing to a charge pump ratio that would result in the intermediate voltage $V_X$ failing to exceed the input voltage $V_{IN}$. Conversely, in a transition from boost mode 24 to buck mode 26, one should avoid a reconfiguration event that would result in the intermediate voltage $V_X$ exceeding the input voltage $V_{IN}$. It is primarily to implement this method that certain theoretically permissible transitions between buck mode 26 and boost mode 24 have been omitted in FIG. 7.

Yet another way to suppress the likelihood of mode oscillation relies on choosing modes so that an average value of the intermediate voltage $V_X$ will have enough of a margin such that, even with the effect of ringing or transients added to it, another mode change will be unlikely. In particular, for any margin, there exists a probability of a spurious transition that results from ringing in one or more of the operation signals of the first set. The margin is selected such that the probability of such a transition falls below a pre-determined threshold.

For the FIG. 1 example of a step-up converter, a state transition that causes the regulator 18 to transition from buck mode 26 to boost mode 24 would also reduce the charge pump's voltage-transformation ratio, thus increasing the average value of the intermediate voltage $V_X$. This will tend to "park" the regulator 18 deep into boost mode 24, thus rendering a spurious transition into buck mode 26 unlikely. Conversely, a state transition that causes the regulator 18 to transition from boost mode 24 into buck mode 26 would increase the charge pump's voltage-transformation ratio. This will have the opposite effect, namely decreasing the average value of the intermediate voltage $V_X$. This, in turn, tends to park the regulator 18 deep into buck mode 26, thus rendering a spurious transition into boost mode 24 more unlikely. In either case, the output voltage $V_{OUT}$ remains relatively unchanged because the output capacitor 14 is typically much larger than any of the capacitors within the charge pump 20.

In some implementations, a computer accessible storage medium includes a database representative of one or more components of the power converter 10. For example, the database may include data representative of a charge pump that has been optimized to promote low-loss operation of the charge pump 20.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples. Alternatively, the database may itself be the netlist (with or without the synthesis library) or the data set.

Having described the invention, and a preferred embodiment thereof, what is claimed as new and secured by Letters Patent is:

1. An apparatus comprising a controller that controls operation of a power converter in which a regulator that is operable in plural regulator modes connects to a charge pump that is operable in plural charge-pump modes, wherein said controller receives a clock signal, an input/output (I/O) signal, and, from said power converter receives information indicative of operation of said power converter and, based at least in part on said information, causes first and second transitions, wherein said first transition is between regulator modes and wherein said second transition is between charge-pump modes,
wherein, as a result of said first transition, said regulator is exclusively able to increase a voltage provided to said regulator, wherein said second transition is permitted in response to a condition selected from a group consisting of a first condition and a second condition is true, wherein said first condition is that said second transition results in no change to said charge pump's voltage-transformation ratio, and wherein said second condition is that said charge pump's voltage-transformation ratio decreases.

2. The apparatus of claim 1, wherein said controller causes said first and second transitions concurrently.

3. The apparatus of claim 1, wherein said controller causes said first and second transitions serially.

4. The apparatus of claim 1, wherein causing said second transition comprises causing said charge pump to change a voltage-transformation ratio thereof.

5. The apparatus of claim 1, wherein said controller comprises a state machine that implements logic for causing said first and second transitions.

6. The apparatus of claim 1, wherein said controller comprises a synchronous Moore finite state machine.

7. The apparatus of claim 1, wherein said controller comprises a state machine that receives a clock signal having an adaptive duration between clock pulses thereof.

8. The apparatus of claim 1, wherein said controller comprises a Mealy finite state machine.

9. The apparatus of claim 1, wherein said controller comprises an asynchronous state machine.

10. The apparatus of claim 1, wherein there exists a plurality of possible transitions between buck mode and boost mode and wherein said controller comprises a state machine that permits, exclusively, some of said possible transitions.

11. The apparatus of claim 1, wherein, in response to starting said power converter, said controller chooses an initial mode of operation for said regulator based at least in part on a state of an output capacitor of said power converter.

12. The apparatus of claim 1, wherein, for a selected time interval following one of said first and second transitions, said controller ignores said information indicative of operation of said power converter.

13. The apparatus of claim 1, wherein said controller selects said first and second transitions such that a probability of a spurious transition between modes is reduced to below a selected threshold.

14. The apparatus of claim 1, wherein said information includes information indicative of existence of a fault and wherein, in response to said information indicative of said existence, said controller disables circuitry within said power converter.

15. The apparatus of claim 1, wherein said information includes information indicative of resolution of a fault and wherein, in response to said information indicative of said resolution, said controller re-enables disabled circuitry within said power converter.

16. The apparatus of claim 1, wherein said controller disables said regulator in response.

17. The apparatus of claim 1, wherein said information includes information indicative of existence of a fault and wherein, in response to said information indicative of said existence, said controller disables circuitry within said power converter.

18. An apparatus comprising a controller that controls operation of a power converter in which a regulator that is operable in plural regulator modes connects to a charge pump that is operable in plural charge-pump modes, wherein said controller receives a clock signal, an I/O signal, and receives from said power converter, information indicative of operation of said power converter and, based at least in part on said information, causes first and second transitions, wherein said first transition is between regulator modes and wherein said second transition is between charge-pump modes,
wherein said controller comprises a state machine that implements logic for causing said first and second transitions, wherein, as a result of said first transition, said regulator is exclusively able to decrease a voltage provided to said regulator, wherein said second transition is permitted in response to a condition selected from a group consisting of a first condition and a second condition is true, wherein said first condition is that said second transition results in no change to said charge pump's voltage-transformation ratio, and wherein said second condition is that said charge-pump's voltage-transformation ratio increases.

19. An apparatus comprising a controller that controls operation of a power converter in which a regulator that is operable in plural regulator modes connects to a charge pump that is operable in plural charge-pump modes, wherein said controller receives a clock signal, an I/O signal, and receives from said power converter, information indicative of operation of said power converter and, based at least in part on said information, causes first and second transitions, wherein said first transition is between regulator modes and wherein said second transition is between charge-pump modes, wherein
said regulator receives an input voltage across first and second regulator terminals and provides an output voltage across third and fourth regulator terminals and comprises an inductor, first and second switches that connect said inductor to said first and second regulator terminals respectively, and third and fourth switches that connect said inductor to said third and fourth regulator terminals respectively, wherein, as a result of said first transition, said third switch remains closed during operation of said regulator, wherein said second transition is permitted in response to a condition selected from a group consisting of a first condition and a second condition is true, wherein said first condition is that said second transition results in no change to said charge-pump's voltage-transformation ratio, and wherein said second condition is that said charge-pump's voltage-transformation ratio decreases.

20. An apparatus comprising a controller that controls operation of a power converter in which a regulator that is operable in plural regulator modes connects to a charge pump that is operable in plural charge-pump modes, wherein said controller receives a clock signal, an I/O signal, and receives from said power converter, information indicative of operation of said power converter and, based at least in part on said information, causes first and second transitions, wherein said first transition is between regulator modes and wherein said second transition is between charge-pump modes, wherein said controller comprises a state machine that implements logic for causing said first and second transitions, wherein said regulator receives an input voltage across first and second regulator terminals and provides an output voltage across third and fourth regulator terminals and comprises an inductor, first and second switches that connect said inductor to said first and second regulator terminals respectively, and third and fourth switches that connect said inductor to said third and fourth regulator terminals respectively, wherein, as a result of said first transition, said first switch remains closed during operation of said regulator, wherein said second transition is permitted, exclusively, in response to a condition selected from a group consisting of a first condition and a second condition is true, wherein said first condition is that said second transition results in no change to said charge-pump's voltage-transformation ratio and wherein said second condition is that said charge-pump's voltage-transformation ratio increases.

* * * * *